United States Patent
Mori et al.

(10) Patent No.: US 12,001,195 B2
(45) Date of Patent: Jun. 4, 2024

(54) STATE EVALUATION SYSTEM, STATE EVALUATION APPARATUS, AND STATE EVALUATION METHOD

(71) Applicants: Kabushiki Kaisha Toshiba, Tokyo (JP); Toshiba Carrier Corporation, Kawasaki (JP)

(72) Inventors: Yoshinori Mori, Kawasaki (JP); Hidefumi Takamine, Shinagawa (JP); Kazuo Watabe, Yokohama (JP); Hayato Toda, Fuji (JP)

(73) Assignees: Kabushiki Kaisha Toshiba, Tokyo (JP); Toshiba Carrier Corporation, Kawasaki (JP)

( * ) Notice: Subject to any disclaimer, the term of this patent is extended or adjusted under 35 U.S.C. 154(b) by 107 days.

(21) Appl. No.: 17/447,087

(22) Filed: Sep. 8, 2021

(65) Prior Publication Data
US 2021/0397161 A1 Dec. 23, 2021

Related U.S. Application Data

(63) Continuation of application No. PCT/JP2020/031830, filed on Aug. 24, 2020.

(30) Foreign Application Priority Data

Feb. 28, 2020 (JP) .................................. 2020-033336

(51) Int. Cl.
G05B 19/418 (2006.01)
(52) U.S. Cl.
CPC ..... G05B 19/4184 (2013.01); G05B 19/4183 (2013.01)

(58) Field of Classification Search
CPC .................................................. G05B 19/4184
USPC .......................................................... 700/108
See application file for complete search history.

(56) References Cited

U.S. PATENT DOCUMENTS

| 6,332,362 B1 | 12/2001 | Lee et al. |
| 2003/0149547 A1 | 8/2003 | Nakao et al. |
| 2009/0204347 A1 | 8/2009 | Nowicki et al. |
| 2010/0058867 A1 | 3/2010 | Ueno et al. |

(Continued)

FOREIGN PATENT DOCUMENTS

| CN | 105676082 A | 6/2016 |
| DE | 10 2017 124 281 A1 | 2/2019 |

(Continued)

OTHER PUBLICATIONS

Hase, "Research on Recognition and Evaluation of Fricition and Wear Phenomena Using Acoustic Emission Method" Jan. 2009, 176 pages (with Partial English Machine Translation).

*Primary Examiner* — Hien D Khuu
(74) *Attorney, Agent, or Firm* — Oblon, McClelland, Maier & Neustadt, L.L.P.

(57) ABSTRACT

A state evaluation system includes a sensor, a filter, a signal processor, and an evaluator. The sensor detects elastic waves which are generated from industrial equipment in operation. The filter can pass elastic waves having frequency characteristics based on abrasion which is generated in the industrial equipment. The signal processor extracts a plurality of feature values using the elastic waves passing through the filter. The evaluator evaluates an abnormality of the industrial equipment on the basis of a combination of the extracted plurality of feature values.

6 Claims, 8 Drawing Sheets

(56) References Cited

U.S. PATENT DOCUMENTS

| | | | | |
|---|---|---|---|---|
| 2015/0059886 A1* | 3/2015 | Anderson | ........... | F16K 37/0091 |
| | | | | 137/551 |
| 2017/0138910 A1 | 5/2017 | Usui et al. | | |
| 2017/0205316 A1* | 7/2017 | Araki | ....................... | F04C 18/16 |
| 2017/0363586 A1* | 12/2017 | Takamine | .......... | G01N 29/4454 |
| 2017/0363587 A1* | 12/2017 | Takamine | ............ | G01N 29/043 |

FOREIGN PATENT DOCUMENTS

| | | | |
|---|---|---|---|
| JP | 3325015 B2 | | 9/2002 |
| JP | 2003-076414 A | | 3/2003 |
| JP | 2007-315863 A | | 12/2007 |
| JP | 4809455 B2 | | 11/2011 |
| JP | 2011-252761 A | | 12/2011 |
| JP | 2015-220379 A | | 12/2015 |
| JP | 2007-3299 A | | 1/2017 |
| JP | 2017-090311 A | | 5/2017 |
| JP | 2019-3389 A | * | 1/2019 |
| KR | 10-1997-0000636 B1 | | 1/1997 |
| WO | WO 2018/051534 A1 | | 3/2018 |

* cited by examiner

STATE EVALUATION SYSTEM, STATE EVALUATION APPARATUS, AND STATE EVALUATION METHOD

This is a Continuation Application of International Application PCT/JP2020/031830, filed on Aug. 24, 2020, and the entire contents of all of which are incorporated herein by reference.

FIELD

Embodiments described herein relate generally to a state evaluation system, a state evaluation apparatus, and a state evaluation method.

BACKGROUND

It is difficult to visually ascertain an internal state of a compressor for an air-conditioning or heat source system until the lifespan of the compressor expires after the compressor has been assembled into an outdoor unit. Accordingly, in order to appropriately manage a replacement timing of the compressor, it is necessary to monitor occurrence of an abnormality and progress of the abnormality in the compressor using any method. In the related art, a method using a signal which is acquired from an AE sensor attached to the outside of a compressor has been proposed as a method of detecting an abnormality of the compressor (for example, see Patent Literature 1 and Patent Literature 2). The AE sensor may detect a change of a signal at a timing at which an abnormality in an initial stage such as fine cracks or abrasion serving as a starting point of minor destruction occurs. Accordingly, when elastic waves which are generated from sliding portions (for example, a combination of a shaft of a rotary member and bearings or a combination of a blade and a roller) in a compressor can be detected, it is considered that a sliding state in the compressor can be estimated from the outside of a casing without incorporating a sensor into the inside of the compressor. On the other hand, a compressor normally vibrates in operation. Accordingly, detected elastic waves may often be based on vibration of a housing or stress/strain in a compression process. In this case, it is difficult to determine whether the detected elastic waves are elastic waves generated due to an abnormality of the compressor or elastic waves generated due to stress/strain. Accordingly, an abnormality in a compressor may not be accurately evaluated. This problem is not limited to a compressor but is commonly caused in general industrial equipment including sliding portions.

DETAILED DESCRIPTION

The present invention provides a problem to be solved by the present invention is to provide a state evaluation system, a state evaluation apparatus, and a state evaluation method that can accurately evaluate an abnormality of industrial equipment.

According to one embodiment, a state evaluation system includes a sensor, a filter, a signal processor, and an evaluator. The sensor detects elastic waves which are generated from industrial equipment in operation. The filter is able to pass elastic waves having frequency characteristics based on abrasion which is generated in the industrial equipment. The signal processor extracts a plurality of feature values using the elastic waves passing through the filter. The evaluator evaluates an abnormality of the industrial equipment on the basis of a combination of the extracted plurality of feature values.

Hereinafter, a state evaluation system, a state evaluation apparatus, and a state evaluation method according to an embodiment will be described with reference to the accompanying drawings.

Figure 1:
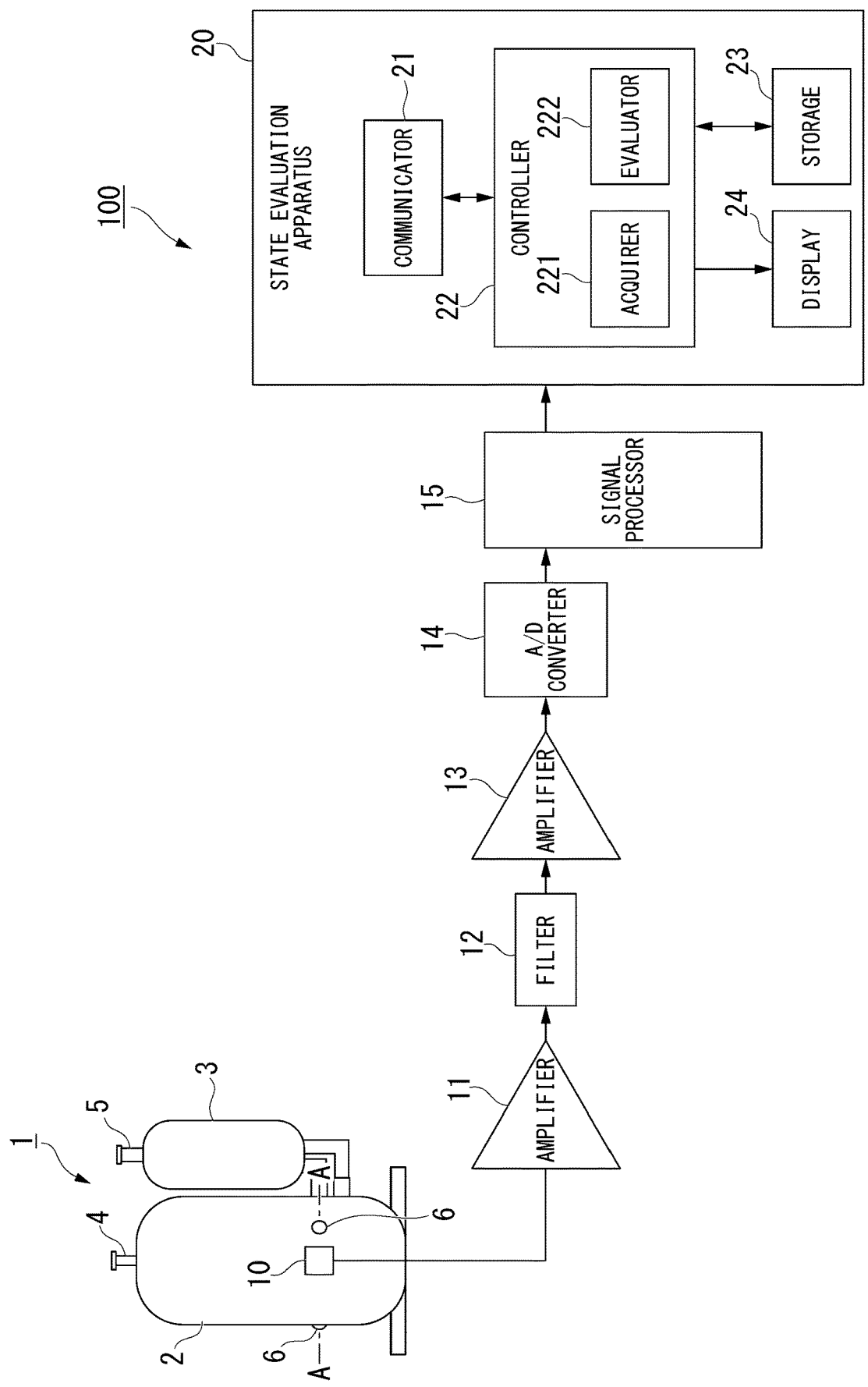
FIG. 1 is a diagram illustrating a configuration of a state evaluation system according to an embodiment.

FIG. 1 is a diagram illustrating a configuration of a state evaluation system 100 according to an embodiment. The state evaluation system 100 is used to evaluate an abnormality of industrial equipment. In this embodiment, a compressor is described as an example of the industrial equipment, but the industrial equipment is not limited to a compressor. The industrial equipment may be any equipment as long as it is industrial equipment including sliding portions. Examples of the industrial equipment include a motor, an electric motor, and a pump. The sliding portions are portions which slide with respect to each other such as a combination of a shaft and a bearing of a rotary member and a combination of blade and a roller. An abnormality of industrial equipment in this embodiment is, for example, damage of the sliding portions which are provided in the industrial equipment.

The state evaluation system 100 includes a compressor 1, a sensor 10, an amplifier 11, a filter 12, an amplifier 13, an A/D converter 14, a signal processor 15, and a state evaluation apparatus 20. The signal processor 15 and the state evaluation apparatus 20 are connected such that they can communicate with each other in a wired or wireless manner. When the signal processor 15 and the state evaluation apparatus 20 are connected in a wireless manner, for example, a so-called industry science medical band (ISM band) such as a 2.4 GHz band or 920 MHz band (915 MHz to 928 MHz in Japan) can be used as a radio frequency band.

The compressor 1 is a device that pressurizes and compresses a gas such as air or gas. The compressor 1 is, for example, a displacement compressor or a centrifugal compressor. In this embodiment, it is assumed that the compressor 1 is a displacement compressor. Displacement compressors are classified into a reciprocation type, a rotary type, a scroll type, a screw type, and the like. For example, it is assumed that the compressor 1 operates at a rotation speed of 60 revolutions per second (rps). The compressor 1 is used for an industrial air-conditioning or heat source system and an air-conditioning system for a building or a factory. The compressor 1 includes a casing 2 and an accumulator 3. The casing 2 and the accumulator 3 are connected via pipe. The casing 2 includes a discharge tube 4 and an arc spot 6. The discharge tube 4 discharges compressed gas to the outside. The accumulator 3 takes in a refrigerant from an intake tube 5 and separates the refrigerant into a liquid refrigerant and a gas refrigerant. A sectional view along line A-A of the compressor 1 is illustrated in FIG. 2.

Figure 2:
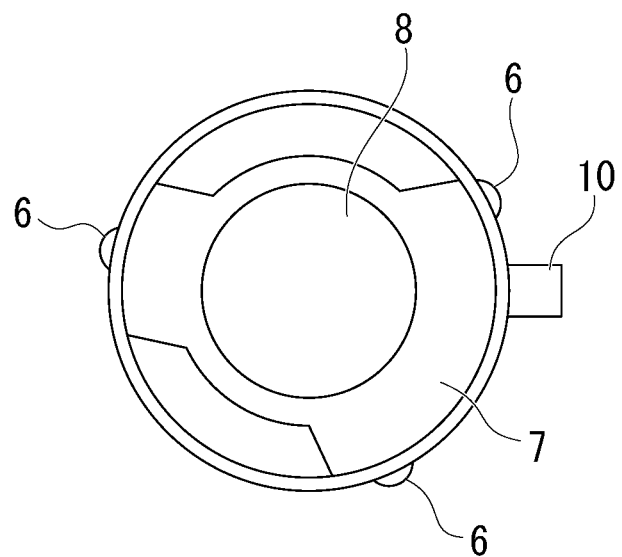
FIG. 2 is a sectional view along line A-A of a compressor according to the embodiment.

FIG. 2 is a sectional view along line A-A of the compressor 1 according to the embodiment.

At least a cylinder 7 is provided in the compressor 1. A compression chamber 8 is provided in the cylinder 7. The sensor 10 is provided outside of the compressor 1. In the compression chamber 8, compression of a refrigerant is performed by sliding portions. When an abnormality occurs in sliding portions in the compressor 1, elastic waves supposed to be based on abrasion are generated due to sliding of a shaft of a rotary member and bearings against each other. The elastic waves generated in the compressor 1 are likely to be detected near the arc spot 6 to which the casing 2 and the cylinder 7 are fixed in the compressor 1. Therefore, the sensor 10 is provided near the arc spot 6. It is preferable that the sensor 10 be installed in a range within a distance that is a predetermined multiple of (for example, three times) a diameter of the arc spot 6. Accordingly, it is possible to enhance detection accuracy for elastic waves.

Figure 3:
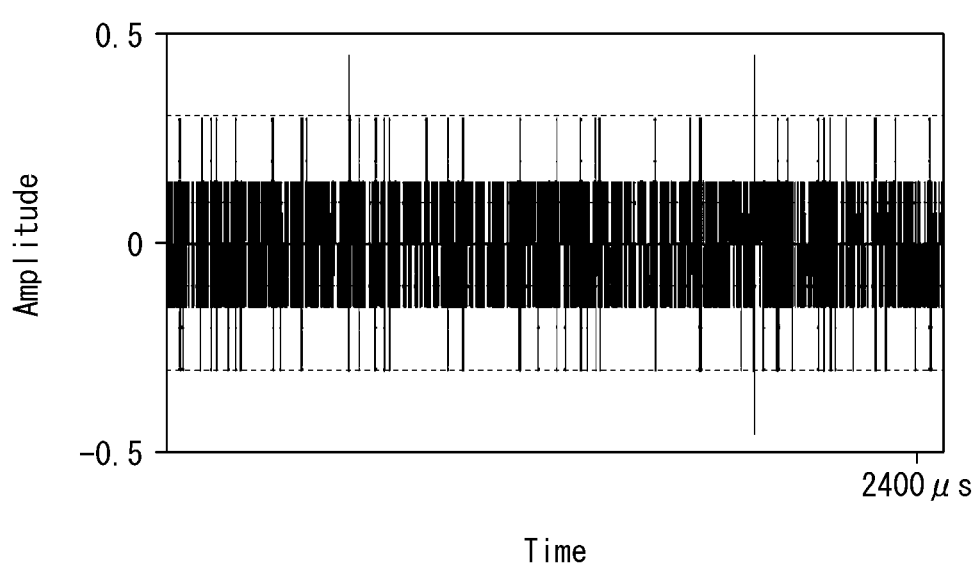
FIG. 3 is a diagram illustrating an example of an elastic wave signal not based on abrasion according to the embodiment.
Figure 4:
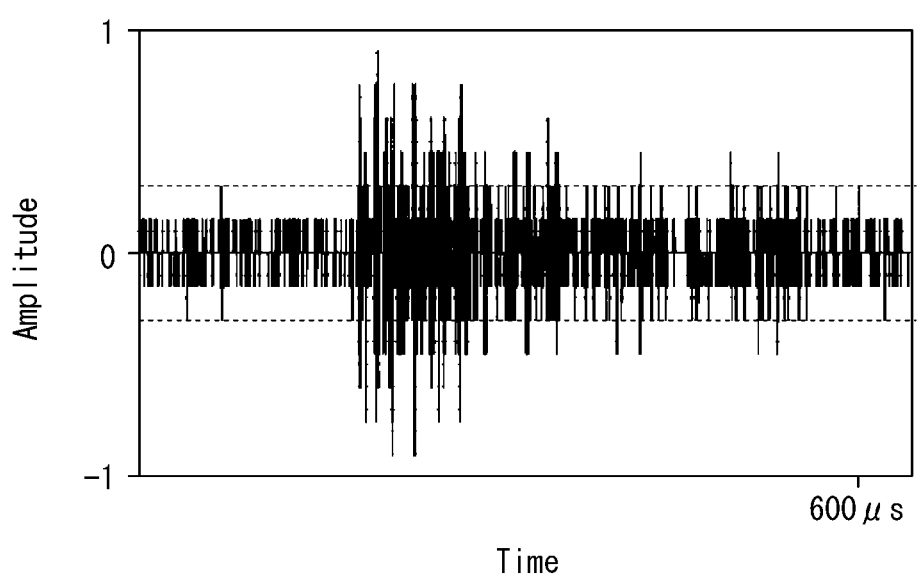
FIG. 4 is a diagram illustrating an example of an elastic wave signal supposed to be based on abrasion according to the embodiment.

The elastic waves generated in the compressor 1 are not limited to the elastic waves supposed to be based on abrasion and also include elastic waves not based on abrasion due to vibration of a housing or stress/strain in a compression process. Examples of an elastic wave signal generated in the compressor 1 are illustrated in FIGS. 3 and 4. FIG. 3 is a diagram illustrating an example of an elastic wave signal not based on abrasion. FIG. 4 is a diagram illustrating an elastic wave signal supposed to be based on abrasion. In FIGS. 3 and 4, the horizontal axis represents time and the vertical axis represents the amplitude of an elastic wave signal. As illustrated in FIGS. 3 and 4, elastic waves supposed to be based on abrasion and elastic waves not based on abrasion have different signal waveforms. Therefore, the state evaluation apparatus 20 according to this embodiment evaluates an abnormality of the compressor 1 by detecting such a difference in elastic waves.

Description with reference to FIG. 1 will be continued.

The sensor 10 is installed near the arc spot 6 of the compressor 1. The sensor 10 may be directly installed in the casing 2 or may be installed in the casing 2 using a magnet holder which is suitable for a shape of a sensor head of the sensor 10. When the sensor 10 is directly installed in the casing 2, the sensor 10 adheres to the casing 2 with an adhesive. When the sensor 10 is installed in the casing 2 using a magnet holder which is suitable for a shape of a sensor head of the sensor 10, the sensor 10 is installed with grease or an elastic member on a contact surface between the sensor head and the casing. The sensor 10 detects elastic waves which are generated in the compressor 1. The sensor 10 outputs the detected elastic waves as an electrical signal to the amplifier 11. For example, a piezoelectric device having sensitivity in a range of 10 kHz to 1 MHz is used as the sensor 10. The sensor 10 is classified as a resonance type sensor having a resonance peak in a frequency range, a wideband type sensor in which resonance is suppressed, or the like and any of these types can be used as the sensor 10. A voltage output type, a resistance variation type, a capacitance type, or the like can be used as a method which is used for the sensor 10 to detect elastic waves, and the detection method is not particularly limited.

The amplifier 11 amplifies elastic waves output from the sensor 10. The amplifier 11 outputs the amplified elastic waves to the filter 12. For example, the amplifier 11 amplifies the elastic waves to such an extent that the elastic waves can be processed by the filter 12.

The filter 12 filters the elastic waves output from the amplifier 11. The filter 12 is a band-pass filter which is set to pass a signal in a predetermined frequency band. For example, the filter 12 is a filter which is set to pass elastic waves having frequency characteristics based on abrasion. For example, the filter 12 is set to pass a signal of a frequency higher than 500 kHz. When the compressor 1 is a rotary type compressor, it is preferable that the filter 12 be set to pass a signal of 520 kHz to 850 kHz.

The amplifier 13 amplifies elastic waves passing through the filter 12. The amplifier 13 outputs the amplified elastic waves to the A/D converter 14. For example, the amplifier 13 amplifies the elastic waves passing through the filter 12 by a predetermined quantity (for example, 10 times to 100 times).

The A/D converter 14 quantizes and converts the amplified elastic waves to a digital signal. The A/D converter 14 outputs the digital signal to the signal processor 15.

The signal processor 15 receives the digital signal output from the A/D converter 14 as an input. The signal processor 15 performs signal processing on the input digital signal. Examples of the signal processing which is performed by the signal processor 15 include noise removal and feature value extraction. The signal processor 15 generates transmission data including the digital signal subjected to the signal processing. The signal processor 15 outputs the generated transmission data to the state evaluation apparatus 20. The signal processor 15 is constituted by an analog circuit or a digital circuit. The digital circuit is realized, for example, by a field-programmable gate array (FPGA) or a microcomputer. The digital circuit may be realized by a dedicated large-scale integration (LSI). The signal processor 15 may include a nonvolatile memory such as a flash memory or a removable memory.

The state evaluation apparatus 20 evaluates an abnormality of the compressor 1 using the digital signal which is included in the transmission data output from the signal processor 15. The state evaluation apparatus 20 includes a communicator 21, a controller 22, a storage 23, and a display 24.

The communicator 21 receives the digital signal output from the signal processor 15.

The controller 22 controls the state evaluation apparatus 20 as a whole. The controller 22 is constituted by a processor such as a central processing unit (CPU) and a memory. The controller 22 serves as an acquirer 221 and an evaluator 222 by executing a program. The program for realizing the acquirer 221 and the evaluator 222 may be installed in the state evaluation apparatus 20 at the time of shipment or may be separately installed later.

The acquirer 221 acquires the transmission data output from the signal processor 15. For example, when the signal processor 15 and the state evaluation apparatus 20 communicate in a wireless manner, the acquirer 221 serves as a communication interface and acquires the transmission data by performing wireless communication with the signal processor 15. For example, when the signal processor 15 communicates with the state evaluation apparatus 20 in a wired manner, the acquirer 221 serves as a communication interface and acquires the transmission data by performing wired communication with the signal processor 15.

The evaluator 222 evaluates an abnormality of the compressor 1 on the basis of the transmission data acquired by the acquirer 221. Specifically, the evaluator 222 evaluates an abnormality of the compressor 1 on the basis of a combination of a plurality of feature values acquired from the elastic waves. More specifically, the evaluator 222 evaluates that an abnormality has occurred in the compressor 1 when a departing proportion of a correlation between a plurality of feature values of a plurality of elastic waves is equal to or greater than a threshold value.

The storage 23 stores the transmission data acquired by the acquirer 221. The storage 23 is constituted by a storage device such as a magnetic hard disk device or a semiconductor storage device.

The display 24 is an image display device such as a liquid crystal display or an organic electroluminescence (EL) display. The display 24 displays an evaluation result under the control of the controller 22. The display 24 may be an interface for connecting an image display device to the state evaluation apparatus 20. In this case, the display 24 generates an image signal for displaying an evaluation result and outputs the image signal to the image display device connected thereto.

Figure 5:
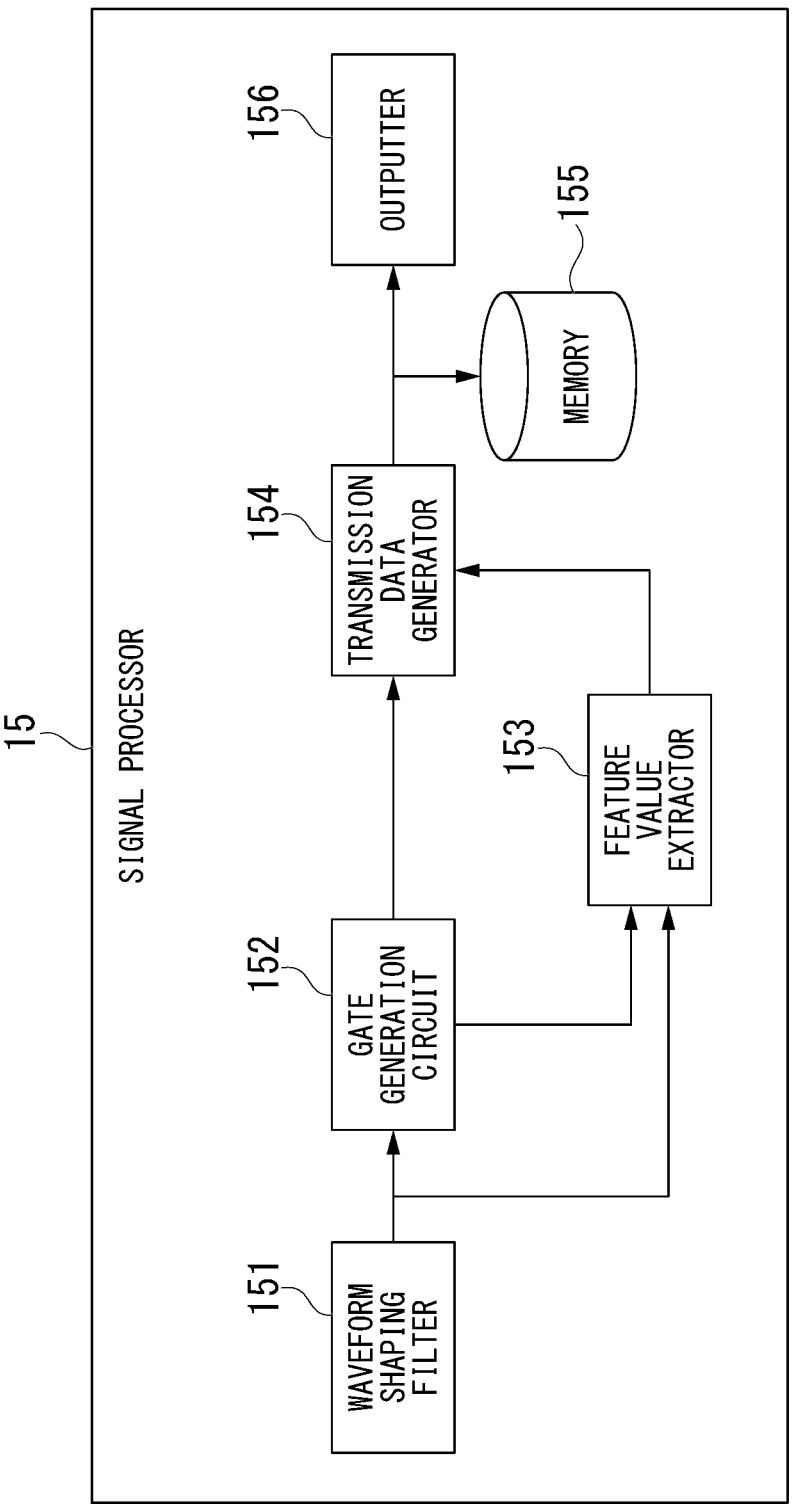
FIG. 5 is a block diagram schematically illustrating a function of a signal processor according to the embodiment.

FIG. 5 is a block diagram schematically illustrating the function of the signal processor 15 according to the embodiment. As illustrated in FIG. 2, the signal processor 15 includes a waveform shaping filter 151, a gate generation circuit 152, a feature value extractor 153, a transmission data generator 154, a memory 155, and an outputter 156.

The waveform shaping filter 151 removes a noise component outside a predetermined signal band from a digital signal of input time-series data. The waveform shaping filter 151 is, for example, a digital band-pass filter (BPF). For example, it is assumed that the waveform shaping filter 151 is set to pass the same frequency band as the filter 12. The waveform shaping filter 151 outputs a signal from which a noise component has been removed (hereinafter referred to as a "noise-removed elastic wave signal") to the gate generation circuit 152 and the feature value extractor 153.

The gate generation circuit 152 receives the noise-removed elastic wave signal output from the waveform shaping filter 151 as an input. The gate generation circuit 152 generates a gate signal indicating whether a waveform of the input noise-removed elastic wave signal is maintained. The gate generation circuit 152 is realized by, for example, an envelope detector and a comparator. The envelope detector detects an envelope of the noise-removed elastic wave signal. The envelope is extracted, for example, by performing a predetermined process (for example, a process using a low-pass filter or a Hilbert transformation) on an output value obtained by squaring the noise-removed elastic wave signal. The comparator determines whether the envelope of the noise-removed elastic wave signal is equal to or greater than a predetermined threshold value.

When the envelope of the noise-removed elastic wave signal is equal to or greater than the predetermined threshold value, the gate generation circuit 152 outputs a first gate signal indicating that the waveform of the noise-removed elastic wave signal is maintained to the feature value extractor 153. On the other hand, when the envelope of the noise-removed elastic wave signal is less than the predetermined threshold value, the gate generation circuit 152 outputs a second gate signal indicating that the waveform of the noise-removed elastic wave signal is not maintained to the feature value extractor 153.

The feature value extractor 153 receives the noise-removed elastic wave signal output from the waveform shaping filter 151 and the gate signal output from the gate generation circuit 152 as inputs. The feature value extractor 153 extracts a feature value of the noise-removed elastic wave signal using the noise-removed elastic wave signal input while the first gate signal is being input. The feature value is information indicating a feature of the noise-removed elastic wave signal.

Examples of the feature value include the amplitude of a waveform [mV], an ascent time of a waveform [μsec], a duration of a gate signal [μsec], a zero-crossing count [times], energy of a waveform [arb.], a frequency [Hz], an arrival time, and a root-mean-square (RMS) value. The feature value extractor 153 outputs a parameter associated with the extracted feature value to the transmission data generator 154.

The amplitude of a waveform is, for example, a value of maximum amplitude of the noise-removed elastic wave signal. The ascent time of a waveform is, for example, a period of time T1 from start of the ascent of the gate signal to a time point at which the noise-removed elastic wave signal reaches a maximum value. The duration of the gate signal is, for example, a period of time from start of the ascent of the gate signal to a time point at which the amplitude becomes less than a preset value. The zero-crossing count is, for example, the number of times the noise-removed elastic wave signal crosses a reference line passing through a zero value. The energy of a waveform is, for example, a value which is obtained by temporally integrating a value acquired by squaring the amplitude of the noise-removed elastic wave signal at each time point. The definition of the energy is not limited to the aforementioned example, but may be, for example, approximated using an envelope of a waveform. The frequency is a frequency of the noise-removed elastic wave signal. The arrival time is a time at which the elastic waves are detected. The RMS value is, for example, a value which is obtained by calculating a square root of a value acquired by squaring the amplitude of the noise-removed elastic wave signal at each time point.

The transmission data generator 154 receives a parameter associated with a feature value as an input. The transmission data generator 154 generates transmission data including the input parameter associated with a feature value.

The memory 155 stores the transmission data. The memory 155 is, for example, a dual-port random access memory (RAM).

The outputter 156 sequentially outputs the transmission data stored in the memory 155 to the state evaluation apparatus 20.

Figure 6:
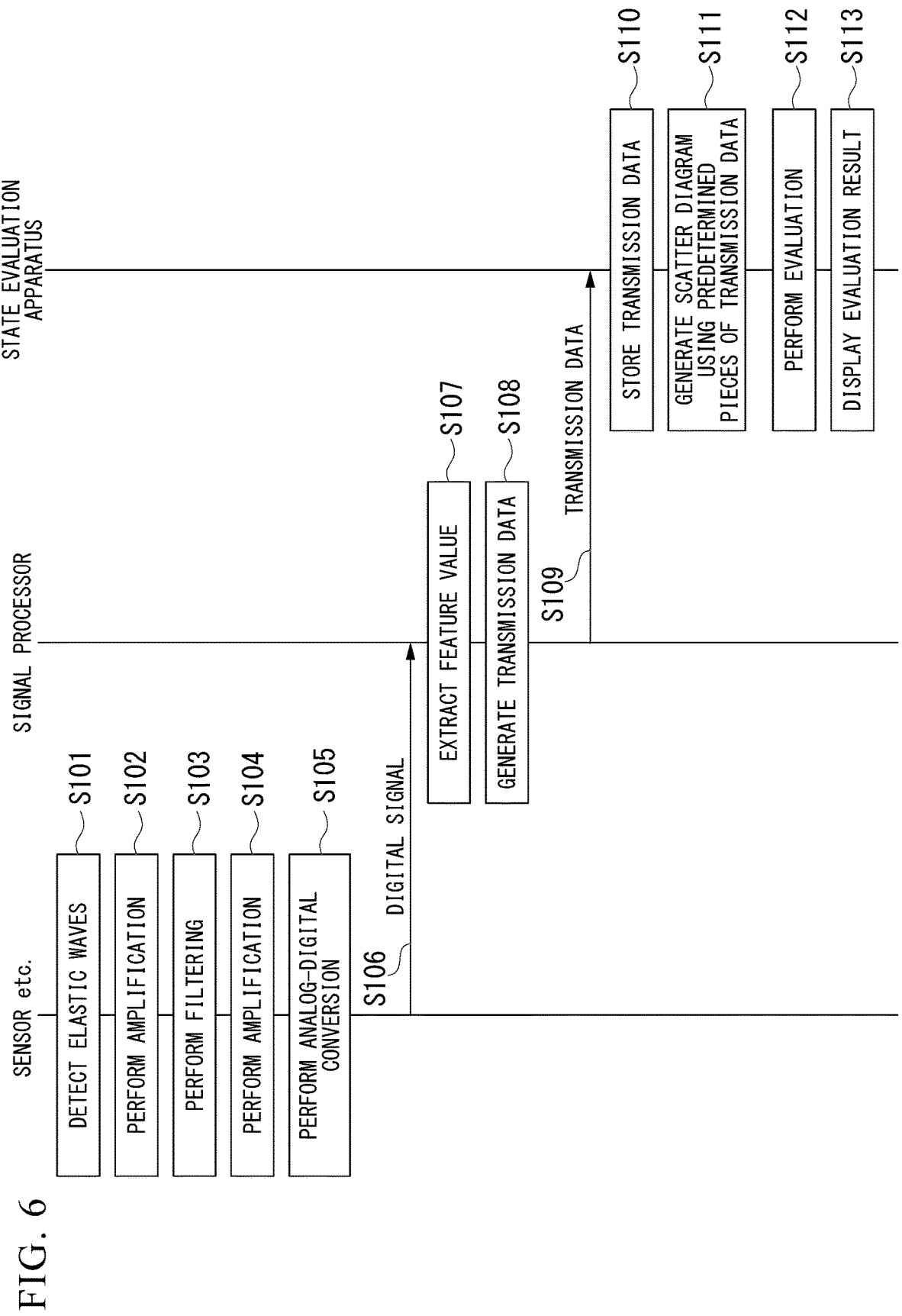
FIG. 6 is a sequence diagram illustrating a routine of an abnormality evaluating process which is performed by the state evaluation system according to the embodiment.

FIG. 6 is a sequence diagram illustrating a routine of an abnormality evaluating process which is performed by the state evaluation system 100 according to the embodiment. In the example illustrated in FIG. 6, it is assumed that the compressor 1 is operating and the sensor 10, the amplifier 11, the filter 12, the amplifier 13, and the A/D converter 14 are included as the sensor and the like.

The sensor 10 detects elastic waves generated in the compressor 1 in operation (Step S101). The sensor 10 outputs the detected elastic waves to the amplifier 11. The amplifier 11 amplifies the elastic waves output from the sensor 10 (Step S102). The amplifier 11 outputs the amplified elastic waves to the filter 12. The amplified signal output from the amplifier 11 is filtered by the filter 12 (Step S103). Accordingly, it is possible to detect elastic waves supposed to be based on abrasion, which do not include a signal not based on abrasion is removed, are extracted from the elastic waves detected from the compressor 1 in operation.

The elastic waves filtered by the filter 12 are input to the amplifier 13. The amplifier 13 amplifies the input elastic waves (Step S104). The amplifier 13 outputs the amplified signal to the A/D converter 14. The A/D converter 14 quantizes and converts the input elastic signal to a digital signal (Step S105). The A/D converter 14 outputs the digital signal to the signal processor 15 (Step S106).

The signal processor 15 receives the digital signal output from the A/D converter 14 as an input. The signal processor 15 extracts a feature value of the elastic waves using the input digital signal (Step S107). Specifically, the feature value extractor 153 extracts a feature value of a noise-removed elastic wave signal using the noise-removed elastic wave signal which is the digital signal input while the first gate signal is being input. The signal processor 15 outputs a parameter associated with the extracted feature value to the transmission data generator 154. The transmission data generator 154 generates transmission data including the parameter associated with the feature value (Step S108). The outputter 156 sequentially outputs the transmission data to the state evaluation apparatus 20 (Step S109).

The communicator 21 of the state evaluation apparatus 20 receives the transmission data output from the signal processor 15 and the acquirer 221 acquires the transmission data received by the communicator 21. The acquirer 221 stores the acquired transmission data in the storage 23 (Step S110). When a predetermined number of pieces of transmission data are stored in the storage 23, the evaluator 222 generates a scatter diagram indicating a correlation between a plurality of feature values using a plurality of pieces of transmission data (Step S111). Specifically, first, the evaluator 222 acquires a plurality of feature values from a plurality of pieces of transmission data. For example, the evaluator 222 acquires energy of a waveform and duration of a gate signal as the plurality of feature values from the plurality of pieces of transmission data. Then, the evaluator 222 generates a scatter diagram indicating a correlation with duration set for the horizontal axis and with energy set for the vertical axis using the acquired energy of a waveform and the acquired duration of a gate signal.

Figure 7:
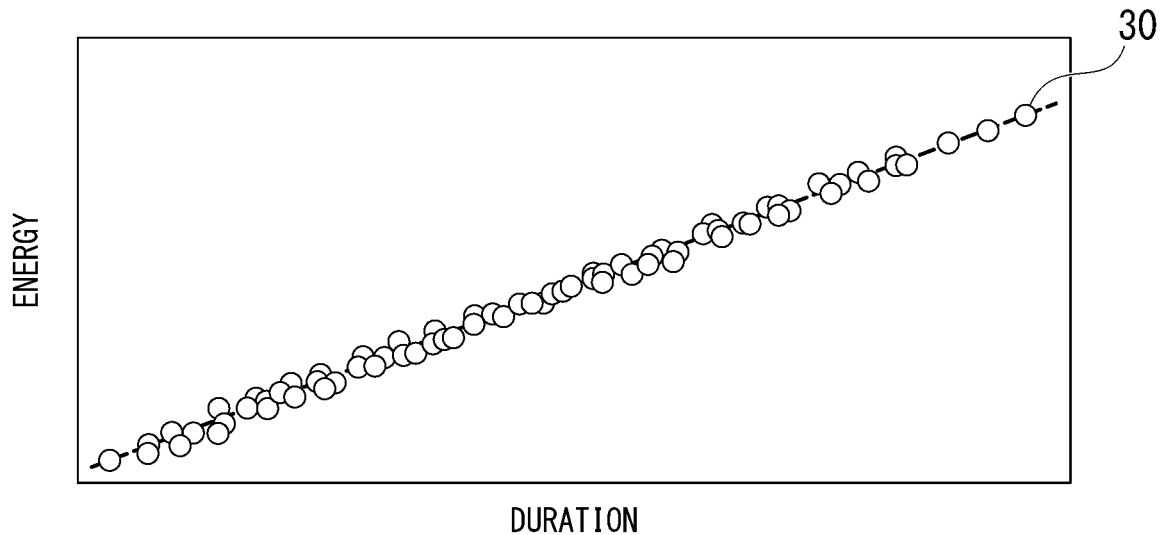
FIG. 7 is a scatter diagram which is obtained when an abnormality does not occur in the compressor according to the embodiment.
Figure 8:
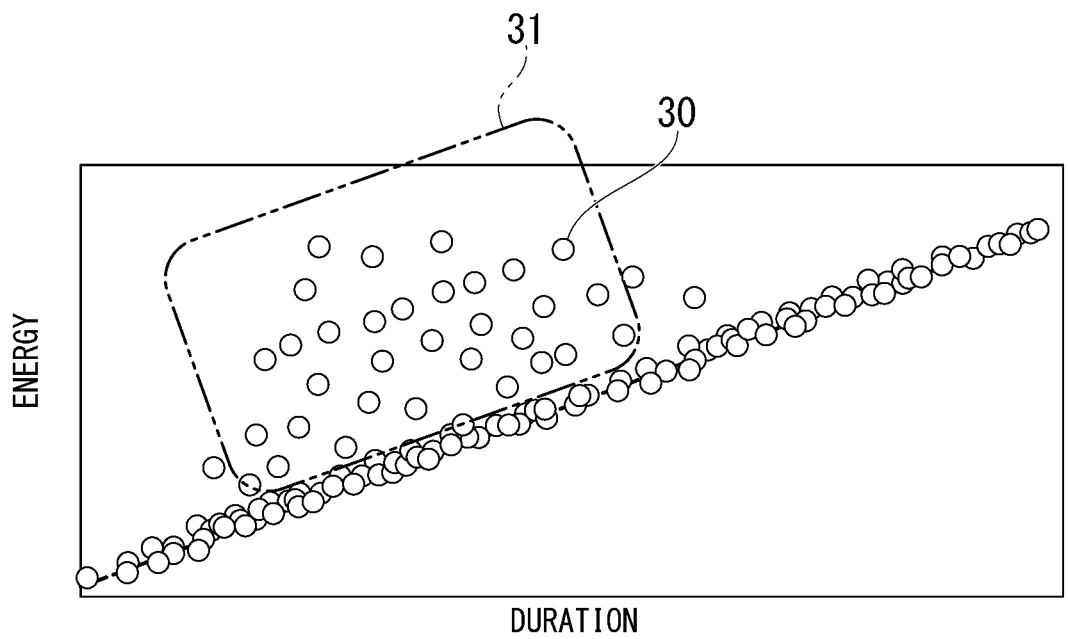
FIG. 8 is a scatter diagram which is obtained when an abnormality occurs in the compressor according to the embodiment.

An example of the scatter diagram is illustrated in FIGS. 7 and 8. FIG. 7 is a diagram illustrating an example of a scatter diagram which is acquired when an abnormality does not occur in the compressor 1. FIG. 8 is a diagram illustrating an example of a scatter diagram which is acquired when an abnormality occurs in the compressor 1. Points 30 illustrated in FIGS. 7 and 8 are points which are plotted on the basis of a plurality of feature values acquired from elastic waves. The points 30 illustrated in FIGS. 7 and 8 are plotted on the basis of energy of a waveform acquired from elastic waves and duration of a gate signal. In a compressor 1 in which sliding portions have not been damaged, the measured energy of elastic waves tends to increase in proportion to the duration of the signal as illustrated in FIG. 7. On the other hand, when the sliding portions in the compressor 1 have an abnormality, points 30 departing from the correlation between the energy of elastic waves and the duration appear frequently as indicated by an area 31 in FIG. 8. The evaluator 222 evaluates an abnormality in the compressor 1 on the basis of the proportions of the departing points 30 (Step S112). Specifically, the evaluator 222 draws an approximate straight line on the generated scatter diagram and evaluates that an abnormality has occurred in the compressor 1 when the proportion of the points 30 (a proportion with respect to all the points 30) departing a predetermined distance from the approximate straight line is equal to or greater than a threshold value. The evaluator 222 outputs an evaluation result to the display 24. The display 24 displays the evaluation result output from the evaluator 222 (Step S113). The display 24 may display the scatter diagram or display whether there is an abnormality as the evaluation result.

The state evaluation system 100 having the aforementioned configuration filters elastic waves acquired from the sensor 10 attached to the casing 2 of the compressor 1 using the filter 12 and extracts elastic waves based on abrasion (elastic waves with characteristics of small amplitude and relatively high frequencies), which are generated in the compressor 1 in operation. Then, the state evaluation apparatus 20 evaluates an abnormality of the compressor 1 on the basis of a combination of a plurality of feature values acquired form the elastic waves. Accordingly, it is possible to perform evaluation with elastic waves based on vibration or stress/strain in a compression process excluded. Accordingly, it is not necessary to distinguish elastic waves based on vibration or stress/strain in a compression process and elastic waves based on an abnormality in the compressor 1. As a result, it is possible to accurately evaluate an abnormality in the compressor.

The evaluator 222 evaluates that an abnormality has occurred in the compressor 1 when the proportion of points departing from an approximate straight line which is derived from a correlation between a plurality of feature values of a plurality of elastic waves is equal to or greater than a threshold value. When there are departing elastic waves, there is a likelihood that an abnormality would have occurred in the equipment. However, when the departing proportion is low (for example, less than the threshold value), the elastic waves may be elastic waves which have accidently been generated. On the other hand, when the departing proportion is equal to or greater than the threshold value, it is thought that the elastic waves are not elastic waves which have accidently been generated but are elastic waves which are not normally generated due to an abnormality in the equipment. Therefore, the evaluator 222 can find out an abnormality without providing a sensor or the like in the equipment by evaluating that an abnormality has occurred in the compressor 1 when the departing proportion is equal to or greater than the threshold value.

A modified example of the state evaluation system 100 will be described below.

At least one of the amplifier 11, the filter 12, the amplifier 13, and the A/D converter 14 may be incorporated into the signal processor 15. The signal processor 15 may be provided in the state evaluation apparatus 20.

Some or all of the functional units of the state evaluation apparatus 20 may be provided in a separate housing. For example, the state evaluation apparatus 20 may include the communicator 21, the controller 22, and the storage 23 and the display 24 may be provided in a separate housing. In this configuration, the controller 22 controls the communicator 21 such that an evaluation result is output to the display 24 provided in a separate housing.

In this embodiment, a configuration in which energy of a waveform and duration are used as a plurality of feature values is described above, but the plurality of feature values which are used for the evaluator 222 to perform evaluation are not limited thereto. The evaluator 222 may perform evaluation by combining any feature values as long as they are feature values acquired from elastic waves. For example, the evaluator 222 may use energy of a waveform and amplitude of a waveform as a plurality of feature values. In this case, a scatter diagram is generated in the same way as in the aforementioned embodiment except that the feature values used to generate the scatter diagram are different. Evaluation based on a combination of other feature values (for example, energy of a waveform and amplitude of a waveform) will be described below with reference to FIGS. 9 and 10. In this case, the evaluator 222 generates a scatter diagram with the energy of a waveform set for the horizontal axis and with the maximum amplitude of a waveform set for the vertical axis using the acquired energy of a waveform and amplitude of a waveform.

Figure 9:
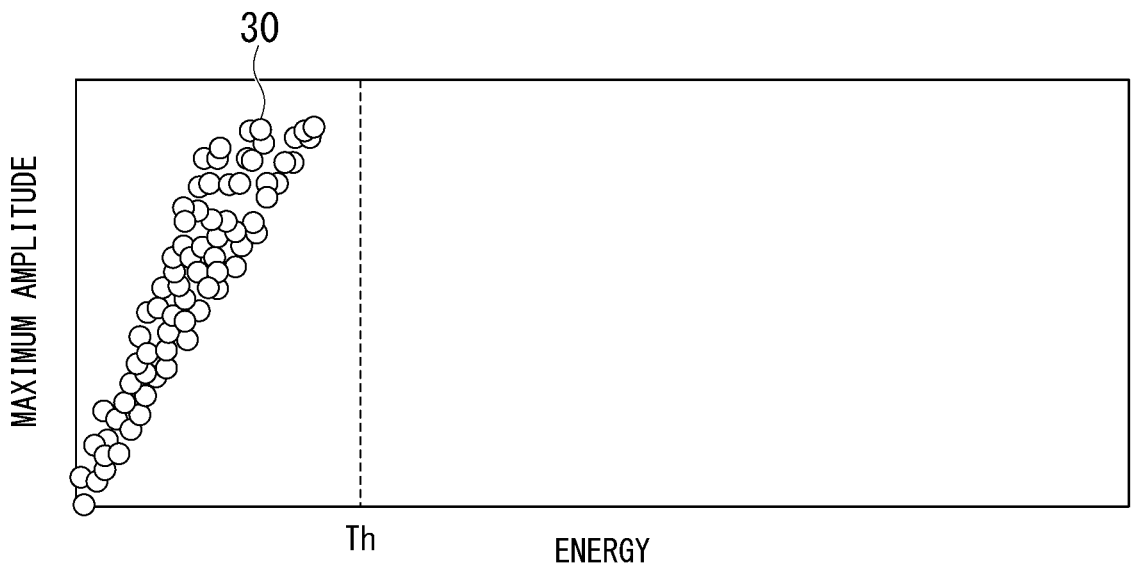
FIG. 9 is a diagram illustrating an example of a scatter diagram which is obtained when an abnormality does not occur in the compressor according to the embodiment.
Figure 10:
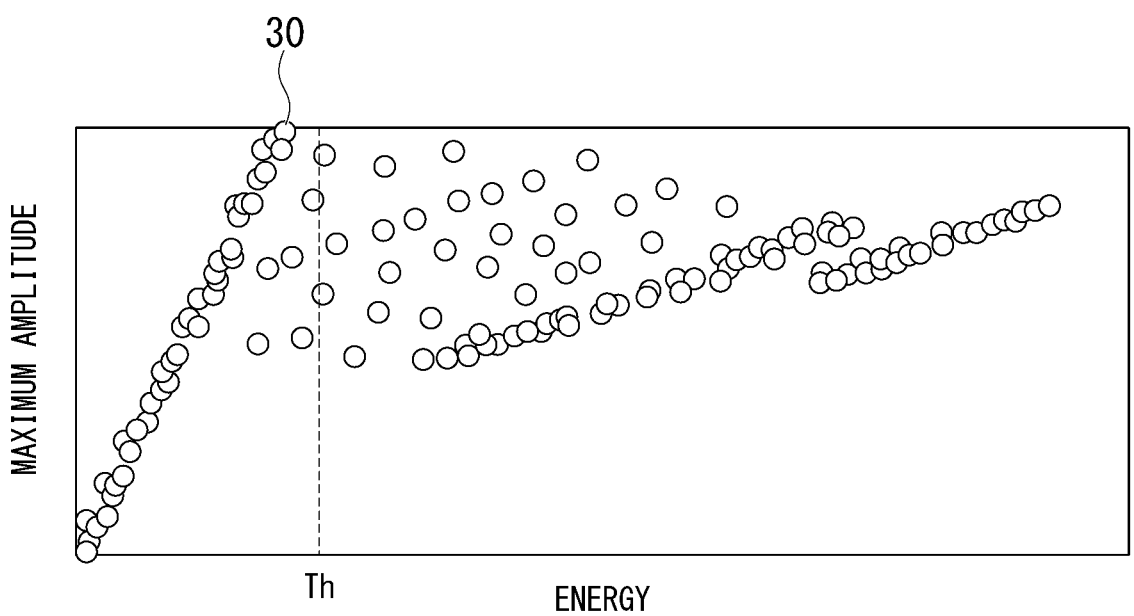
FIG. 10 is a diagram illustrating an example of a scatter diagram which is obtained when an abnormality occurs in the compressor according to the embodiment.

FIG. 9 illustrates an example of a scatter diagram which is acquired when an abnormality does not occur in the compressor 1. FIG. 10 illustrates an example of a scatter diagram which is acquired when an abnormality occurs in the compressor 1. Points 30 illustrated in FIGS. 9 and 10 are points which are plotted on the basis of a plurality of feature values acquired from elastic waves. The points 30 illustrated in FIGS. 9 and 10 are plotted on the basis of energy of a waveform and amplitude of a waveform acquired from elastic waves. In a compressor 1 in which sliding portions have an abnormality, the measured energy of elastic waves becomes greater in comparison with a case in which the sliding portions in the compressor 1 have not been damaged. Therefore, the evaluator 222 evaluates that an abnormality has occurred in the compressor 1 when the number of points plotted with equal to or greater than certain energy set as a threshold value Th in the generated scatter diagram is equal to or greater than a predetermined number. On the other hand, the evaluator 222 evaluates that an abnormality has not occurred in the compressor 1 when the number of points plotted with equal to or greater than the energy set as the threshold value Th in the generated scatter diagram is less than the predetermined number. The threshold value Th is a preset value and may differ depending on the type of the compressor 1 or may be fixed.

Figure 11:
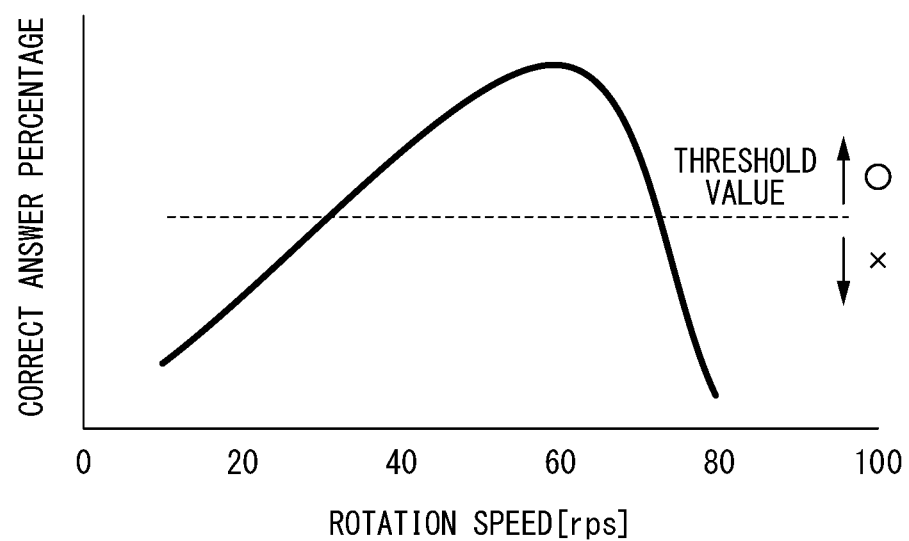
FIG. 11 is a diagram illustrating a relationship between a rotation speed of the compressor and a correct answer proportion of an evaluation result according to the embodiment.

In this embodiment, 60 rps has been exemplified as the rotation speed of the compressor 1, but the rotation speed of the compressor 1 is not limited thereto. For example, it is preferable that the rotation speed of the compressor 1 be in a range of 30 rps to 70 rps. The reason thereof will be described below with reference to FIG. 11. FIG. 11 is a diagram illustrating a relationship between the rotation speed of the compressor 1 and a correct answer percentage of the evaluation result from the evaluator 222. In FIG. 11, the horizontal axis represents the rotation speed and the vertical axis represents the correct answer percentage. The correct answer percentage is an index indicating evaluation accuracy in the evaluator 222. A threshold value in FIG. 11 is a reference value indicating the evaluation accuracy in the evaluator 222. When the correct answer percentage is equal to or greater than the threshold value, it means that the evaluation accuracy in the evaluator 222 is good. When the correct answer percentage is less than the threshold value, it means that the evaluation accuracy in the evaluator 222 is poor. As illustrated in FIG. 11, the correct answer percentage is equal to or greater than the threshold value in a rotation speed range of 30 rps to 70 rps, and the correct answer percentage is markedly low when the correct answer percentage is in a rotation speed range which is less than 30 rps or greater than 70 rps. When the rotation speed is low (less than 30 rps), it is thought that the evaluation accuracy gets worse because elastic waves are not much detected. On the other hand, when the rotation speed is high (greater than 70 rps), it is thought that the evaluation accuracy gets worse because elastic waves generated due to collision between inside devices or the like in addition to the elastic waves supposed to be based on abrasion are much detected. Therefore, in order to accurately detect damage in the compressor 1, it is preferable that the rotation speed of the compressor 1 be in a range of 30 rps to 70 rps.

In this embodiment, the evaluator 222 evaluates an abnormality in the compressor 1 on the basis of the departing proportion from an approximate straight line derived form a correlation between a plurality of feature values. The evaluator 222 may evaluate an abnormality in the compressor 1 using another method on the basis of a correlation between a plurality of feature values. For example, the evaluator 222 may evaluate an abnormality in the compressor 1 using a correlation coefficient based on a correlation between a plurality of feature values or residuals. This will be specifically described below.

Case in which Correlation Coefficient is Used

When duration of a gate signal and energy of a waveform are used as a plurality of feature values, the evaluator 222 calculates a correlation coefficient R between the duration of a gate signal and the energy of a waveform on the basis of Expression (1). In Expression (1), the duration of a gate signal is defined as x, and the energy of a waveform is defined as y.

$$R = \frac{S_{xy}}{S_x S_y} \quad (1)$$

$S_{xy}$ in Expression (1) denotes covariance of the duration (x) of a gate signal and the energy (y) of a waveform. $S_x$ in Expression (1) denotes a standard deviation of the duration of a gate signal. $S_y$ in Expression (1) denotes a standard deviation of the energy of a waveform. As damage progresses increasingly and the number of departing points increases, the correlation between the plurality of feature values collapses and the correlation coefficient decreases. Therefore, the evaluator 222 evaluates that an abnormality has occurred in the compressor 1 when the calculated correlation coefficient R is less than the threshold value. The evaluator 222 evaluates that an abnormality has not occurred in the compressor 1 when the calculated correlation coefficient R is equal to or greater than the threshold value.

Case in which Residuals are Used

When duration of a gate signal and energy of a waveform are used as a plurality of feature values, the evaluator 222 calculates a root-mean-square r of residuals when a correlation between the duration of a gate signal and the energy of a waveform is approximated by linear approximation using a least square method on the basis of Expression (2).

$$r = \mathrm{sqrt}\left[\frac{1}{N}\Sigma(y - f(x))^2\right] \quad (2)$$

In Expression (2), f(x) indicates an approximate straight line. N in Expression (2) denotes the number of pieces of data. The number of pieces of data is, for example, the number of points 30 illustrated in FIGS. 7 and 8. The evaluator 222 evaluates that an abnormality has occurred in the compressor 1 when the calculated root-mean-square r is equal to or greater than a threshold value. The evaluator 222 evaluates that an abnormality has not occurred in the compressor 1 when the calculated root-mean-square r is less than the threshold value.

According to at least one embodiment described above, a state evaluation system includes a sensor, a filter, a signal processor, and an evaluator. The sensor detects elastic waves which are generated from industrial equipment in operation. The filter is able to pass elastic waves having frequency characteristics based on abrasion which is generated in the industrial equipment. The signal processor extracts a plurality of feature values using the elastic waves passing through the filter. The evaluator evaluates an abnormality of the industrial equipment on the basis of a combination of the extracted plurality of feature values. Accordingly, it is possible to accurately evaluate an abnormality of industrial equipment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A state evaluation system comprising:
a sensor configured to detect elastic waves which are generated from industrial equipment in operation;
a filter configured to be passable elastic waves having frequency characteristics based on damage which is generated in the industrial equipment;
a signal processor configured to extract a plurality of feature values using the elastic waves passing through the filter; and
an evaluator configured to evaluate an abnormality of the industrial equipment on the basis of a combination of the extracted plurality of feature values, wherein
the evaluator is configured to
generate a scatter diagram indicating a correlation between energy and duration of the elastic waves when the energy and the duration of the elastic waves are used as the plurality of feature values,
draw an approximate straight line on the generated scatter diagram, the approximate straight line being derived from a correlation between the plurality of feature values acquired from the elastic waves, and
determine that the abnormality of the industrial equipment exists using the elastic waves, when a proportion deviating from the approximate straight line, which is derived from the correlation between the plurality of feature values acquired from the elastic waves, is equal to or greater than a threshold value.

2. The state evaluation system according to claim 1, wherein the evaluator is configured to determine that the abnormality of the industrial equipment exists when a proportion of points deviating a predetermined distance from the approximate straight line is equal to or greater than a threshold value.

3. The state evaluation system according to claim 1, wherein the evaluator is configured to determine that the abnormality of the industrial equipment exists using the elastic waves, when a correlation coefficient which is derived from the plurality of feature values acquired from the elastic waves is less than a threshold value.

4. The state evaluation system according to claim 1, wherein the evaluator is configured to determine that the abnormality of the industrial equipment exists using the elastic waves, when a root-mean-square of residuals from the approximate straight line derived from the correlation between the plurality of feature values acquired from the elastic waves is equal to or greater than a threshold value.

5. A state evaluation apparatus comprising:
a filter configured to pass through elastic waves which are detected by a sensor that detects elastic waves which are generated from industrial equipment, which have frequency characteristics based on damage which is generated in the industrial equipment;
a signal processor configured to extract a plurality of feature values using the elastic waves passing through the filter; and
an evaluator configured to evaluate an abnormality of the industrial equipment in operation on the basis of a combination of the extracted plurality of feature values, wherein
the evaluator is configured to
generate a scatter diagram indicating a correlation between energy and duration of the elastic waves when the energy and the duration of the elastic waves are used as the plurality of feature values,
draw an approximate straight line on the generated scatter diagram, the approximate straight line being derived from a correlation between the plurality of feature values acquired from the elastic waves, and
determine that the abnormality of the industrial equipment exists using the elastic waves, when a proportion deviating from the approximate straight line, which is derived from the correlation between the plurality of feature values acquired from the elastic waves, is equal to or greater than a threshold value.

6. A state evaluation method comprising:
passing through elastic waves which are detected by a sensor that detects elastic waves which are generated from industrial equipment, which have frequency characteristics based on damage which is generated in the industrial equipment;
extracting a plurality of feature values using the elastic waves passing through; and
evaluating an abnormality of the industrial equipment in operation on the basis of a combination of the extracted plurality of feature values, wherein
the evaluating includes
generating a scatter diagram indicating a correlation between energy and duration of the elastic waves when the energy and the duration of the elastic waves are used as the plurality of feature values,
drawing an approximate straight line on the generated scatter diagram, the approximate straight line being derived from a correlation between the plurality of feature values acquired from the elastic waves, and determining that the abnormality of the industrial equipment exists using the elastic waves, when a proportion deviating from the approximate straight line, which is derived from the correlation between the plurality of feature values acquired from the elastic waves, is equal to or greater than a threshold value.

* * * * *